Nov. 20, 1962 W. S. STRAUSS 3,064,936
SOLENOID OPERATED VALVE
Filed March 21, 1960

INVENTOR.
Walter S. Strauss,
BY
Bean, Brooks, Buckley & Bean.
ATTORNEYS.

United States Patent Office 3,064,936
Patented Nov. 20, 1962

3,064,936
SOLENOID OPERATED VALVE
Walter S. Strauss, Williamsville, N.Y., assignor to Hanau Engineering Company, Inc., Buffalo, N.Y.
Filed Mar. 21, 1960, Ser. No. 16,306
5 Claims. (Cl. 251—141)

This invention relates to valves and more particularly to electromagnetically controlled valves adapted to be interposed in fluid pressure conduits.

The valve of the present invention is of the general type wherein a spring biased valve is normally seated to close the fluid pressure passage with which it is associated and is opened upon the closing of an electrical circuit, the valve per se comprising the armature of an electromagnet. Valves of this general type are notoriously old but the valve of the present invention is constructed in a novel manner which introduces important and unobvious advantages, both as to simplicity and economy of construction and in the provision of a valve which may readily be inserted in a fluid pressure line and which may be disassembled for service and maintenance without disconnecting the pressure passage portion thereof from the fluid pressure line.

The structure of the valve of the present invention is such that the principle parts comprise relative plain cylindrical blocks which lend themselves to simple and convenient pressure sealing of the pressure passage and valving portions thereof and which are extremely simple and accordingly economical to manufacture.

A single specific embodiment of the valve of the present invention is illustrated in the accompanying drawing and described in detail in the following specification. It is to be understood, however, that such embodiment is set forth by way of example only and that certain mechanical variations and modifications may be effected without departing from the principles of the invention, the scope of which is limited only as defined in the appended claims.

Figure 2:
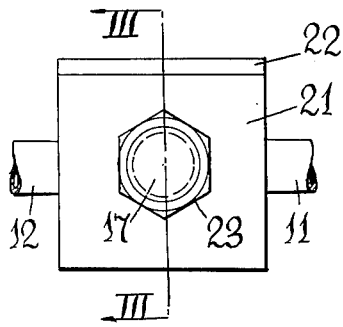
FIG. 2 is a top plan view thereof.
Figure 1:
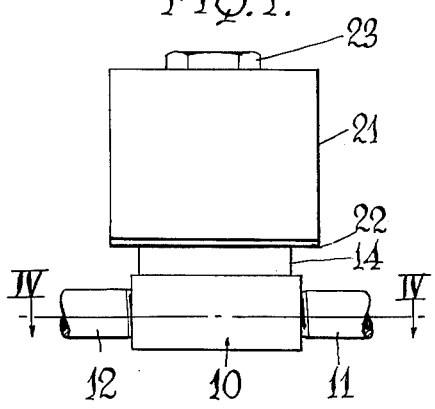
FIG. 1 is an elevational view of one form of the valve of the present invention.

Like characters of reference denote like parts in the several figures of the drawing and the numeral 10 designates a cylindrical block member which contains the inlet and outlet fluid passages or conduits to and from the valve.

Figure 4:
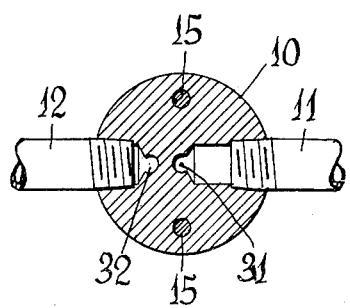
FIG. 4 is a horizontal cross sectional view taken approximately on the line IV—IV of FIG. 1.

The block 10 is connected directly in the pressure line and, in the present instance, referring particularly to FIG. 4, inlet and outlet conduits 11 and 12 are connected to the block 10 as by threading thereinto. The remaining valve structure is removably mounted upon and carried by the block 10 in a manner which will presently appear.

Figure 3:
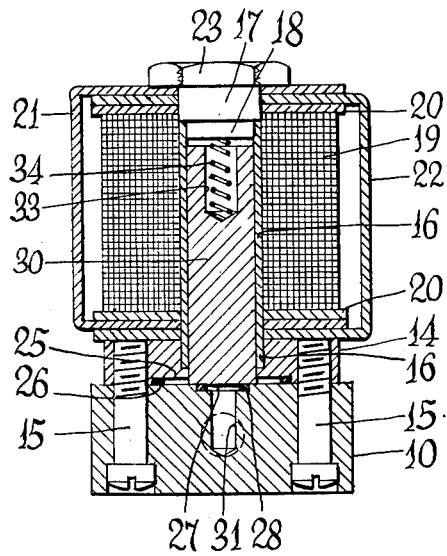
FIG. 3 is a vertical central cross sectional view taken approximately on the line III—III of FIG. 2 on the enlarged scale.

Referring particularly to FIG. 3, a discoidal flange member 14 is removably attached in coaxial relationship to block 10 by screws 15 and is counterbored to receive the end of a sleeve member 16 of non-magnetic material, such as brass or the like. An end of sleeve 16 is inserted in the counterbore and relatively permanently attached to the discoidal member 14 as by silver soldering or other means. A stud member 17 has a reduced end portion 18 which fits into the other end of sleeve 16 and is likewise secured by silver soldering, sweating or the like, so that stud member 17 forms a cylindrical continuation of sleeve 16.

The numeral 19 designates an electromagnetic winding having end collars 20 and a pair of U-shaped iron or steel straps 21 and 22 interfit, as shown in FIG. 3, and likewise fit over the end collars 20 of the electromagnete winding 19. The winding 18 and strap members 21 and 22 are disposed over sleeve 16 and retained thereon by a nut 23 which engages threads formed at the outer end of the stud member 17.

The strap members 21 and 22 provide a magnetic circuit or flux path for the winding 19 and it will be noted that removal of the nut 23 permits complete disassembly of the electromagnetic portion of the device.

The face of discoidal member 14 which is adjacent to block 10 is provided with a relatively shallow counterbore or recess 25 which forms a valved fluid chamber and an O-ring 26 or other suitable packing or gasket means seated in the recess 25 seals the same against radially outward ingress or egress of fluid at the joint between the abutting faces of block 10 and discoidal member 14.

The adjacent face of block 10 is provided with a counterbore 27 which contains an O-ring 28 or other suitable sealing or gasket means. A cylindrical member 30 is slidably disposed in sleeve 16 and its lower end, as viewed in FIG. 3, is adapted to engage downwardly against the O-ring 28 to form a valve and effectively seal the counterbore 27 of block 10 from the counterbore 25 of discoidal member 14. This is the closed position of the valve device. The cylindrical member 30 is of iron or steel and forms an axially movable armature for winding 19.

Inlet conduit 11 terminates in a bore 31 which communicates with counterbore 27 as clearly shown in FIG. 3 and outlet conduit 12 merges with a bore 32 which is in communication with the counterbore 25 of discoidal member 14.

The upper end of valve 30 is bored as at 33 to receive a biasing compression coil spring 34 which acts between stud member 17 and the bottom of the bore 33 to normally urge cylindrical valve member 30 to a valve-closed position, as illustrated in FIG. 3. When winding 19 is energized valve 30 is moved upwardly by electromagnetic attractive force against the urge of spring 34 to a position wherein the upper end of valve 30 abuts the lower face of the reduced end portion 18 of stud member 17 which comprises the open position of the valve.

I claim:
1. In a fluid control valve,
   a sleeve member having a external annular flange at one end thereof,
   said flange having a flat face opposite said sleeve member provided with a counterbore substantially concentric with said sleeve member,
   a valve block having a flat face contiguous with the flat face of said flange and provided with a counterbore substantially concentric with said sleeve member,
   a plunger reciprocably fitted in said sleeve member, means securing said annular flange to said valve block and maintaining the flat faces thereof in mutual contact,
   an O-ring seated within the first mentioned counterbore and having a thickness greater than the depth of such first counterbore to effect a sealed chamber between the flange and valve block, the second counterbore being of a diameter less than the diameter of said plunger and said plunger having a flat end face for marginally seating upon that portion of the flat face of the valve block surrounding said second counterbore, an O-ring seated in said second counterbore and having a thickness greater than the depth of said second counterbore to effect a sealed chamber between said flat end face of the plunger and said valve block, means for seating and unseating said plunger relative to said valve block, and said valve block having a pair of conduits therein, one communicating with the first mentioned chamber and the other communicating with the second mentioned chamber.

2. In a fluid control valve, a sleeve member having an external annular flange at one end thereof, said flange having a flat face opposite said sleeve member provided with a counterbore substantially concentric with said sleeve member, a valve block having a flat contiguous with the flat face of said flange and provided with a counterbore substantially concentric with said sleeve member, a plunger reciprocably fitted in said sleeve member, means securing said annular flange to said valve block and maintaining the flat faces thereof in mutual contact, an O-ring seated within the first mentioned counterbore and having a thickness greater than the depth of such first counterbore to effect a sealed chamber between the flange and valve block, the second counterbore being of a diameter less than the diameter of said plunger and said plunger having a flat end face for marginally seating upon that portion of the flat face of the valve block surrounding said second counterbore, an O-ring seated in said second counterbore and having a thickness greater than the depth of said second counterbore to effect a sealed chamber between said flat end face of the plunger and said valve block, a plug member sealing the end of said sleeve member remote from said flange, a spring disposed between said plug member and said plunger normally urging the flat end face of the latter against said valve block, means mounted on said sleeve member for unseating said plunger from said valve block, and said valve block having a pair of conduits therein, one communicating with the first mentioned chamber and the other communicating with the second mentioned chamber.

3. In a fluid control valve, a sleeve member having an external annular flange at one end thereof, said flange having a flat face opposite said sleeve member provided with a counterbore substantially concentric with said sleeve member, a valve block having a flat face contiguous with the flat face of said flange and provided with a counterbore substantially concentric with said sleeve member, a plunger reciprocably fitted in said sleeve member, means securing said annular flange to said valve block and maintaining the flat faces thereof in mutual contact, an O-ring seated within the first mentioned counterbore and having a thickness greater than the depth of such first counterbore to effect a sealed chamber between the flange and valve block, the second counterbore being of a diameter less than the diameter of said plunger and said plunger having a flat end face for marginally seating upon that portion of the flat face of the valve block surrounding said second counterbore, an O-ring seated in said second counterbore and having a thickness greater than the depth of said second counterbore to effect a sealed chamber between said flat end face of the plunger and said valve block, said sleeve member being closed and externally threaded at that end remote from said flange, electromagnetic winding means surrounding said sleeve member, nut means engaged on said threaded end of the sleeve member and clamping said winding means against said flange, and said valve block having a pair of conduits thereon, one communicating with the first mentioned chamber and the other communicating with the second mentioned chamber.

4. In a fluid control valve, a sleeve member having an external annular flange at one end thereof, said flange having a flat face opposite said sleeve member provided with a counterbore substantially concentric with said sleeve member, a valve block having a flat face contiguous with the flat face of said flange and provided with a counterbore substantially concentric with said sleeve member, a plunger reciprocably fitted in said sleeve member, means securing said annular flange to said valve block and maintaining the flat faces thereof in mutual contact, an O-ring seated within the first mentioned counterbore and having a thickness greater than the depth of such first counterbore to effect a sealed chamber between the flange and valve block, the second counterbore being of a diameter less than the diameter of said plunger and said plunger having a flat end face for marginally seating upon that portion of the flat face of the valve block surrounding said second counterbore, an O-ring seated in said second counterbore and having a thickness greather than the depth of said second counterbore to effect a sealed chamber between said flat end face of the plunger and said valve block, a pair of facing U-shaped members of magnetically permeable material haivng their legs interfitting to form a rectangular frame, an electromagnetic winding fitting within said frame, the other end of said sleeve being closed and externally threaded, nut means engageable with said other end of the sleeve for clamping said U-shaped member and said winding between said flange and said threaded means, and said valve block having a pair of conduits therein, one communicating with the first mentioned chamber and the other communicating with the second mentioned chamber.

5. An electromagnetic valve comprising a pair of facing U-shaped members of magnetically permeable material having their legs interfitting to form a rectangular frame, an electromagnetic winding fitting within said frame, and a sleeve member extending through said interfitting legs and the enclosed winding, a flange fixed to one end of said sleeve, the other end of said sleeve being closed and externally threaded, nut means engageable with said other end of the sleeve for clamping said U-shaped member and said winding between said flange and said threaded means, a conduit block detachably secured to the outer face of said flange, an armature slidable in said sleeve and engageable against said conduit block to provide a valve, a pair of passages in said conduit block, one in registry with said armature and the other offset therefrom, whereby energization of said armature and consequent movement of the armature from said block connects said passages, and spring means acting between the closed end of said sleeve and said armature for urging said armature into valving engagement with said conduit block.

References Cited in the file of this patent

UNITED STATES PATENTS

| | | |
|---|---|---|
| 2,544,209 | Walcott | Mar. 6, 1951 |
| 2,619,986 | Goepfrich | Dec. 2, 1952 |
| 2,627,544 | Eck | Feb. 3, 1953 |
| 2,629,766 | Vargo | Feb. 24, 1953 |
| 2,745,625 | Booth | May 15, 1956 |
| 2,783,021 | Vickley | Feb. 26, 1957 |
| 2,805,689 | DeGroat | Sept. 10, 1957 |
| 2,828,937 | Kreitchman | Apr. 1, 1958 |
| 2,829,319 | McCleskey | Apr. 1, 1958 |

FOREIGN PATENTS

| | | |
|---|---|---|
| 494,316 | Canada | July 7, 1953 |

UNITED STATES PATENT OFFICE
CERTIFICATE OF CORRECTION

Patent No. 3,064,936 November 20, 1962

Walter S. Strauss

It is hereby certified that error appears in the above numbered patent requiring correction and that the said Letters Patent should read as corrected below.

Column 2, line 9, for "electromagnetc" read -- electromagnetic --; line 52, for "a", second occurrence, read -- an --; column 3, line 25, after "flat", first occurrence, insert -- face --; column 4, line 43, for "greather" read -- greater --.

Signed and sealed this 21st day of May 1963.

(SEAL)
Attest:

ERNEST W. SWIDER
Attesting Officer

DAVID L. LADD
Commissioner of Patents